(12) United States Patent
Adam et al.

(10) Patent No.: US 7,697,735 B2
(45) Date of Patent: Apr. 13, 2010

(54) IMAGE BASED MULTI-BIOMETRIC SYSTEM AND METHOD

(75) Inventors: Hartwig Adam, Beverly Hills, CA (US); Hartmut Neven, Malibu, CA (US); Johannes B. Steffens, Westoverledingen (DE)

(73) Assignee: Google Inc., Mountain View, CA (US)

( * ) Notice: Subject to any disclaimer, the term of this patent is extended or adjusted under 35 U.S.C. 154(b) by 871 days.

(21) Appl. No.: 11/158,906

(22) Filed: Jun. 21, 2005

(65) Prior Publication Data

US 2006/0050933 A1 Mar. 9, 2006

Related U.S. Application Data

(60) Provisional application No. 60/581,496, filed on Jun. 21, 2004.

(51) Int. Cl.
*G06K 9/00* (2006.01)
(52) U.S. Cl. ........................ 382/118; 382/115
(58) Field of Classification Search .................. 382/118
See application file for complete search history.

(56) References Cited

U.S. PATENT DOCUMENTS

| | | | | |
|---|---|---|---|---|
| 5,291,560 A * | 3/1994 | Daugman | ................ | 382/117 |
| 5,572,596 A * | 11/1996 | Wildes et al. | ................ | 382/117 |
| 5,719,950 A * | 2/1998 | Osten et al. | ................ | 382/115 |
| 5,729,619 A * | 3/1998 | Puma | ................ | 382/115 |
| 5,751,836 A * | 5/1998 | Wildes et al. | ................ | 382/117 |
| 5,835,616 A * | 11/1998 | Lobo et al. | ................ | 382/118 |
| 6,272,231 B1 | 8/2001 | Maurer et al. | | |
| 6,301,370 B1 * | 10/2001 | Steffens et al. | ................ | 382/103 |
| 6,697,502 B2 * | 2/2004 | Luo | ................ | 382/115 |
| 6,714,665 B1 | 3/2004 | Hanna et al. | | |
| 6,785,406 B1 * | 8/2004 | Kamada | ................ | 382/117 |
| 6,944,318 B1 * | 9/2005 | Takata et al. | ................ | 382/115 |
| 7,415,138 B2 * | 8/2008 | Schneider et al. | ................ | 382/115 |
| 7,440,929 B2 * | 10/2008 | Schneider et al. | ................ | 706/15 |
| 2002/0136435 A1 * | 9/2002 | Prokoski | ................ | 382/118 |
| 2004/0052418 A1 | 3/2004 | DeLean | | |
| 2004/0252865 A1 * | 12/2004 | Tisse | ................ | 382/117 |
| 2005/0185060 A1 | 8/2005 | Neven | | |
| 2006/0012677 A1 | 1/2006 | Neven et al. | | |
| 2006/0050933 A1 * | 3/2006 | Adam et al. | ................ | 382/118 |
| 2006/0093183 A1 * | 5/2006 | Hosoi | ................ | 382/103 |
| 2007/0253604 A1 * | 11/2007 | Inoue et al. | ................ | 382/118 |

(Continued)

FOREIGN PATENT DOCUMENTS

DE 10245900 A1 4/2004

(Continued)

OTHER PUBLICATIONS

Hideo et al., Individual Identification System (Machine translation of JP 10-137222).*

(Continued)

*Primary Examiner*—Sath V Perungavoor
(74) *Attorney, Agent, or Firm*—Fenwick & West LLP

(57) ABSTRACT

This disclosure describes methods to integrate face, skin and iris recognition to provide a biometric system for identifying individuals. These methods only require a digital image depicting a human face as source data.

17 Claims, 4 Drawing Sheets

U.S. PATENT DOCUMENTS

2007/0286490 A1* 12/2007 Danowitz .................. 382/195
2008/0298643 A1* 12/2008 Lawther et al. ............. 382/118

FOREIGN PATENT DOCUMENTS

EP          1020811 A2      7/2000
JP          10-137222    *  5/1998

OTHER PUBLICATIONS

Don Jusko, Human Figure Drawing Proportions, www.realcolorwheel.com/human.htm, pp. 1-16.*
Brunelli et al., "Person Identification Using Multiple Cues", IEEE Trans. Pattern Analysis & Machine Intelligence, Oct. 1995, pp. 955-966, vol. 17, No. 10.
Ben-Yacoub, "Multi-Modal Data Fusion for Person Authentication using SVM", 1998, 11 pages, IDIAP-RR 98-07.
Daugman, "High Confidence Visual Recognition of Persons by a Test of Statistical Independence", IEEE Trans. Pattern Analysis & Machine Intelligence, Nov. 1993, pp. 1148-1161, vol. 15, No. 11.
Fei-Fei, et al., "Learning Generative Visual Models from Few Training Examples: An Incremental Bayesian Approach Tested on 101 Object Categories", 2004, pp. 1-9, GMBV04.
Grother, "Face Recognition Vendor Test 2002, Supplemental Report", Feb. 2, 2004, 34 pages, NISTIR 7083.
Hong et al., "Integrating Faces and Fingerprints for Personal Identification", IEEE Trans. Pattern Analysis & Machine Intelligence, Dec. 1998, pp. 1295-1307, vol. 20, No. 12.
Jain et al., "Score normalization in multimodal biometric systems", Pattern Recognition, 2005, pp. 2270-2285, vol. 38.
Jain et al., "Multibiometric Systems", Communications of the ACM, Jan. 2004, pp. 34-40 + 8 pages, vol. 47, No. 1.
Kovesi, "Image Features from Phase Congruency", Videre: Journal of Computer Vision Research, 1999, pp. 1-27, vol. 1, No. 3, MIT Press.
Lowe, "Object Recognition from Local Scale-Invariant Features.", Proc. ICCV, Sep. 1999, pp. 1150-1157.
Okada et al., "The Bochum/USC Face Recognition System", Published in Face Recognition: From Theory to Applications, 1998, pp. 186-205, Springer-Verlag.
Phillips et al., "The FERET Evaluation Methodology for Face-Recognition Algorithms", IEEE Trans. Pattern Analysis & Machine Intelligence, Oct. 2000, pp. 1090-1104, vol. 22, No. 10.
Phillips et al., "Face Recognition Vendor Test 2002, Evaluation Report", NISTIR 6965, Mar. 2003, 56 pages.
Phillips, "Face Recognition Grand Challenge", Third FRGC Workshop, Feb. 16, 2005, 92 pages.
Ross et al., "Multimodal Biometrics: An Overview", Proc. of the 12th European Signal Processing Conference, Sep. 2004, pp. 1221-1224.
Snelick et al., "Large-Scale Evaluation of Multimodal Biometric Authentication Using State-of-the-Art Systems", IEEE Trans. Pattern Analysis & Machiine Intelligence, Mar. 2005, pp. 450-455, vol. 27, No. 3.
Viola et al., "Rapid Object Detection using a Boosted Cascade of Simple Features", Proc. of IEEE Conf. on Computer Vision and Pattern Rec., Dec. 2001, pp. 1-9.
Wang et al., "Combining Face and Iris Biometrics for Identity Verification", AVPPAO 2003, 8 pages.
"BioAPI Specification , Version 1.1", The BioAPI Consortium, Mar. 16, 2001, 119 pages.
First Office Action of China State Intellectual Property Office, Chinese Application No. 200580026089.8, Feb. 22, 2008.
First Examination Report, India Patent Application No. 79/MUMNP/2007, May 1, 2008.
Kittler, J., et al., "Strategies for combining classifiers employing shared and distinct pattern representations," Pattern Recognition Letters, Nov. 1997, pp. 1373-1377, vol. 18, No. 11-13.
Wiskott, L., et al., "Face Recognition by Elastic Bunch Graph Matching", IEEE Transactions on pattern Analysis And Machine Intelligence, Jul. 1997, p. 775-779, vol. 19, No. 7.

* cited by examiner

IMAGE BASED MULTI-BIOMETRIC SYSTEM AND METHOD

CROSS-REFERENCE TO RELATED APPLICATION

This application claims the benefit of U.S. Patent Application No. 60/581,496, filed Jun. 21, 2004, which is incorporated herein by reference.

BACKGROUND OF THE INVENTION

The present invention relates to methods to integrate face, skin and iris recognition to provide a biometric system with unprecedented level of accuracy for identifying individuals. A compelling feature of this approach is that it only requires a single digital image depicting a human face as source data.

SUMMARY OF THE INVENTION

The present invention may be embodied in a face recognition method, and related apparatus, comprising selecting a single image of a face, locating facial features in the single image, comparing facial features located in the single image with facial features of a reference image, comparing iris features in the single image with iris characteristic in the reference image, and calculating a similarity score between the single image and the reference image based on the facial feature comparison and the iris feature comparison.

In more detailed features of the invention, the single image may have an eye distance resolution of at least about 600 pixels, and may have at least about 5 mega pixels. A skin texture analysis may be performed by comparing skin characteristics of the face in the single image with skin characteristics of a face in a reference image, and the similarity score may be further based on the skin texture analysis. The skin texture analysis may include locating skin areas in the face suitable for skin texture analysis, warping, aligning, and normalizing the located skin areas, and extracting skin characteristics from the located skin areas. The skin characteristics may consist of pores, wrinkles, and moles.

In other more detailed features of the invention, the single image may be selected from a video, and the facial features are located based on facial feature tracking of the facial features in the video. Also, the facial features may be located using elastic bunch graph matching. Alternatively, the facial features may be located using Gabor wavelets.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
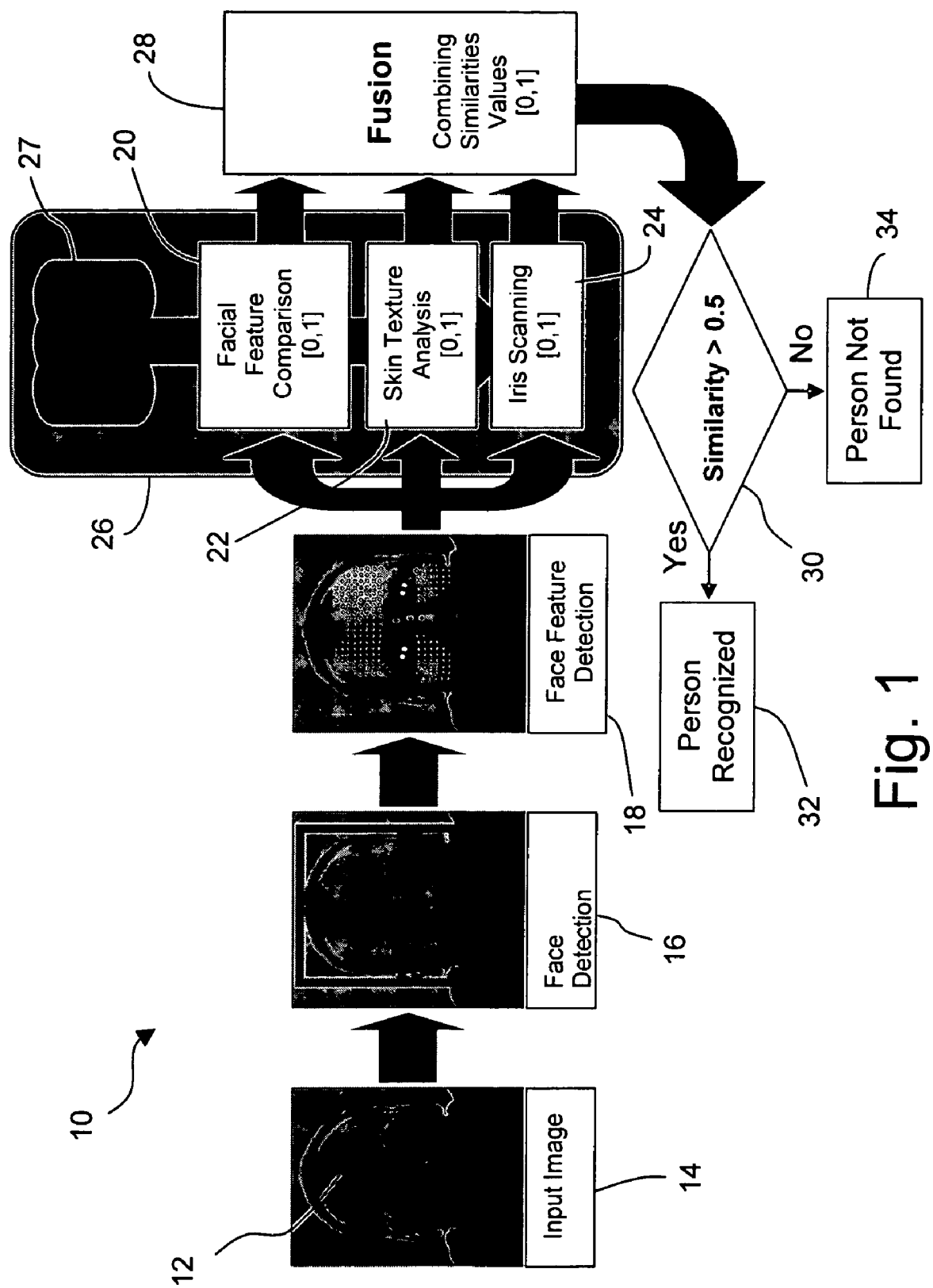
FIG. 1 is a flow chart illustrating a method for recognizing a person from a single digital image using a multi-biometric approach, according to the present invention.

The present invention relates to methods to integrate face, skin and iris recognition to provide a biometric system with unprecedented level of accuracy for identifying individuals. A compelling feature of this approach is that it only requires a single digital image depicting a human face as source data. The false rejection rate may be below 0.001 with a false acceptance rate of 0.01 for a wide range of operating conditions thus exceeding the identification accuracy of traditionally preferred finger printing. The present invention allows efficient search of large databases using a non-invasive biometric that only requires minimal cooperation by the individual to be identified.

Digital cameras are becoming more prevalent and cheaper every day. More over, the resolution of the CCD and similar imaging sensors used by consumer digital cameras has been steadily increasing. Most of the cameras available today are capable of five or more mega pixels enabling a print quality comparable to analog film-based cameras for common print sizes. Recently, the sales of consumer digital cameras worldwide surpassed the cheaper analog cameras. Soon, inexpensive cameras such as web cams and those embedded in mobile handsets will support such high resolutions.

This availability of high resolution images can be exploited to go beyond the existing face recognition techniques in order to increase the accuracy of such biometric systems. The existing techniques rely more on holistic, i.e. image based, matching methods, or on matching of local features extracted from prominent facial landmarks such as nose, eyes or mouth. One very successful example is a face recognition technology, which uses Elastic Bunch Graph Matching to accurately locate the facial feature locations, and computes templates composed of Gabor Wavelet coefficients of various scales and orientations, which form a unique face template for an individual. See, U.S. Pat. No. 6,301,370, FACE RECOGNITION FROM VIDEO IMAGES, issued Oct. 9, 2001.

Using a higher resolution image allows for facial analysis at a more detailed level such as using skin patches extracted from hairless areas on the face, or at an even higher level of detail by analyzing the unique patterns in an individuals iris. The resolution of an image containing a face is not in itself a reliable measure for indicating the pixel resolution in which the face was captured. For example, a very high-resolution image can contain a face that is so far away in the scene that it is represented with very few pixels. Or a fairly low-resolution image may contain a face that is so close-up that most of the resolution in the image is used to represent the face. A more useful resolution measure is an "eye distance resolution" defined herein as the pixel resolution between the left and right pupils in a face. For typical traditional face recognition techniques, an eye distance resolution of about 25 to 80 pixels is needed (e.g. 40 pixels), whereas for skin patch analysis, an eye distance resolution of about 120 to 150 pixels is needed, and for iris analysis an eye distance resolution of about 600 to 650 pixels is needed.

Additionally it is important that the image is not blurry, otherwise the effective image resolution is reduced. Using Fourier methods on the region of a detected face allows for assessing whether the necessary "effective eye distance resolution" has indeed been reached. Finally, it is important to check that the effective pixel depth has been reached. This can easily be achieved using grey value histograms, again taken from the area of a detected face. Advantageously, the pixel depth approaches at least 8 bits.

If a face is captured at a reasonable distance with a 5 or 6 mega pixel camera at a sufficiently narrow visual angel, the eye distance resolution may be within the range for iris analysis techniques, and it thus becomes feasible to extract biometric templates for three completely different biometric methods from one data source. Further, well understood methods to obtain super resolution can employed to increase the effective image resolution (e.g., Superresolution in images using optical flow and irregular Sampling, Marc Rumo 1, Patrick Vandewalle, LCAV—School of Computer and Communication Sciences, Ecole Polytechnique Federale de Lausanne).

A combination of different biometric methods may increase the verification accuracy, and also improve general usability of the biometric system. Successful examples are fusion of voice and face, and fingerprint and face. What these methods have in common is that they require different sensor devices. The method of the present invention allows the combination of the above described biometric methods, face, skin texture analysis and iris recognition, into one single-sensor, image-based multi-biometric system.

The process of the Single Image Multi-Biometric Analysis (SIMBA) 10 is described with reference to FIG. 1. An input image of a face 12 is selected for analysis (step 14). After the face and its facial features have been located (steps 16 and 18) different portions of the face are processed in three semi-orthogonal channels 20, 22 and 24, that analyze the facial, skin texture and iris features, respectively (step 26). The located facial features are compared against corresponding values from face images in a database 27. A fusion module 28 integrates the results of the three channels into a single similarity score. Based on the similarity score (step 30), the person in the image is recognized (step 32) or the person is not found in the database (step 34).

The face detection (step 16) may be performed any of several existing face finders. An advantageous approach uses a decision tree that is trained with the Adaboost algorithm and uses Gabor wavelets as features. This approach achieves a face detection rate on a representative image set of 99.7% with a false alarm rate of 0.001. It outperforms approaches such as suggested by Viola and Jones, "Rapid Object Detection using a Boosted Cascade of Simple Features, Proc. of IEEE Conf. on Computer Vision and Pattern Recognition", December 2001, and Rowley et al. 1998.

The facial feature detection (step 18) may be performed using a high-speed facial feature finding and tracking module based on elastic graph matching technology. See, U.S. Pat. No. 6,272,231, titled WAVELET-BASED FACIAL MOTION CAPTURE FOR AVATAR ANIMATION. Advantageously, fifty-five (55) feature locations in the face are detected and tracked in real-time. This module is unique in accuracy and speed. The facial feature tracking greatly enhances the SIMBA technology in that it allows pinpointing of the facial features including the pupils in every frame of a video sequence. Pinpointing the facial features is a prerequisite for comparing facial features, skin patches and the iris details.

The facial feature comparison (step 20) may be performed using one of several engines on the market, particularly the face recognition engine available from Neven Vision of Santa Monica, Calif. A good choice is similarly described in U.S. Pat. No. 6,301,370, titled FACE RECOGNITION FROM VIDEO IMAGES, which patent is incorporated herein by reference.

Skin texture analysis (step 22) may be based on the analysis of individual skin characteristics like pores, wrinkles, moles, etc. Suitable are smooth, hairless regions of the faces like, for example, the cheeks, chin, nose or forehead. Depending on factors like hairstyle or gender (facial hair), which areas are usable can differ from person to person.

Figure 2:
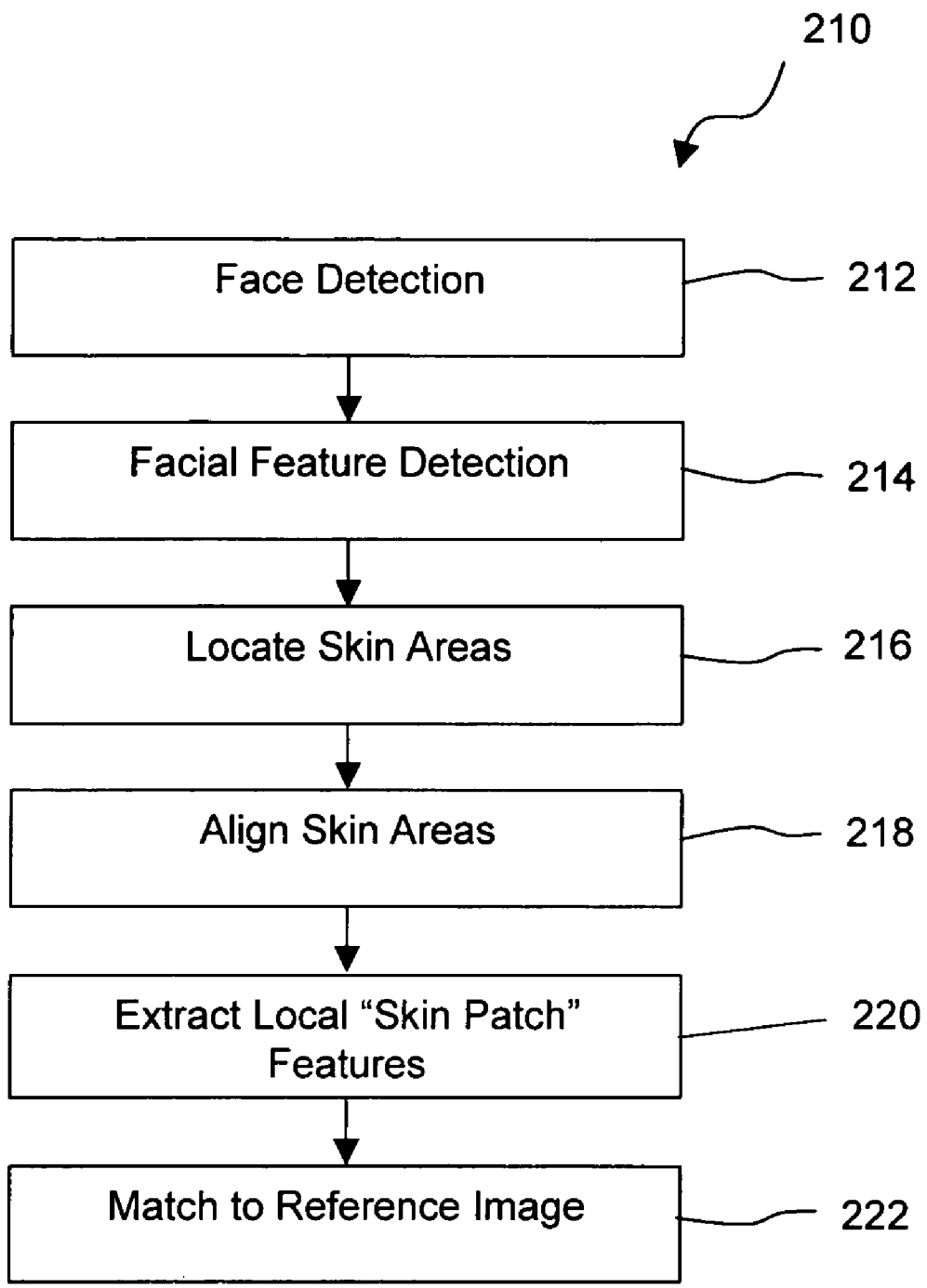
FIG. 2 is a flow chart illustrating a matching process for skin texture analysis.

With reference to FIG. 2, the matching process 210 of the skin texture analysis system may be divided into the following processing steps:

1) detection of the face (step 212);
2) detection of facial features (step 214);
3) location of the skin areas in the face suitable for skin texture analysis (step 216);
4) warp, align and normalize and skin patches (step 218);
5) extract features describing local skin areas (step 220);
6) compare these features to the reference image, and compute similarity score (step 222).

A recent solution disclosed by Bruno Delean divides the area below the eyes in rectangular blocks and uses simple block matching algorithms and a heuristic evaluation of the relative location of neighboring blocks to compute the similarity score. (Bruno Delean, Method and apparatus for probabilistic image analysis, U.S. Patent Application Publication No. 2004/0052418). Previously described approaches employed more sophisticated methods based on elastic graph matching using Gabor Wavelets (Buhmann et al. 1990, and Wiskott et al. 1997).

Since current face recognition and facial sensing technology (e.g., U.S. Pat. No. 6,301,370) relies on accurately pinpointing the location of prominent facial features, it is ideally suited for application to biometric identification based on Skin Texture Analysis. One option is to use Elastic Graph Matching technology. The Elastic Graph Matching technology represents faces as a labeled graph whose nodes correspond to facial landmarks like eye corner or the tip of the nose, and is capable of placing this graph with high precision on a face in a presented image. Based on these found landmarks, it is possible to accurately locate the areas in the face that are used for skin texture analysis. This face recognition technology is able to determine local characteristics of the face, e.g., whether facial hair or glasses are present or not. Using this information, a more reliable individualized face map of suitable areas for skin analysis can be derived.

Figure 3:
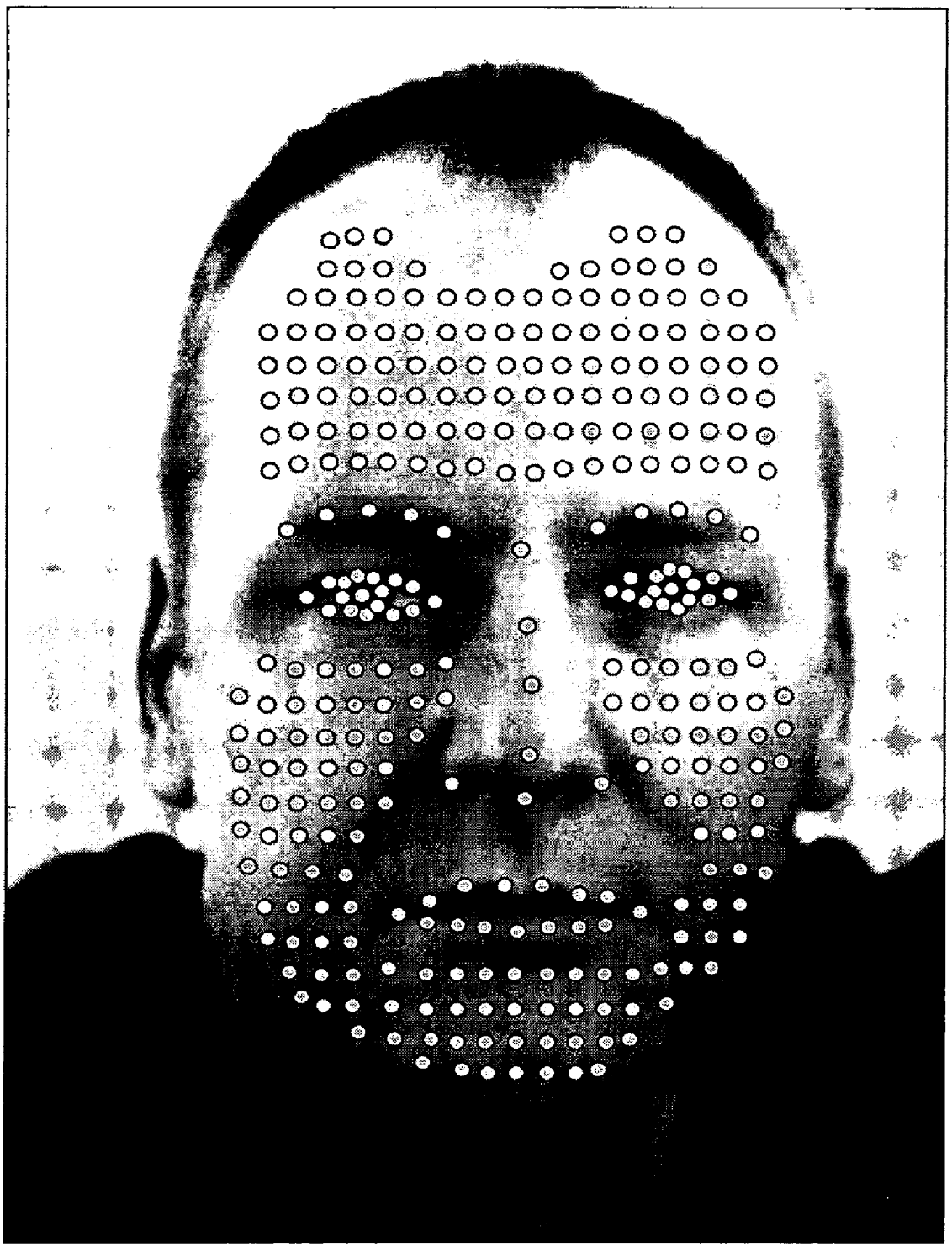
FIG. 3 is a picture of a face image showing nodes of a graph located at facial features of interest.

With reference to FIG. 3, nodes of an elastic graph may be adapted for high-resolution images. Higher node densities than commonly used are placed on the hairless skin areas and on the iris areas. The parameters of the feature vector extracted at each node are adapted to optimally account for the expected signal content. The node positions in FIG. 3 are conceptual. Actual node densities—in particular—on the iris, may be higher.

Further, since the position and expression of facial features may be derived, an extracted skin patch may be normalized or un-warped before it is analyzed. An example of such a scenario would be where the face of the user to be identified is captured with an exaggerated expression such as a strong smile or frown causing the area under the eye where the skin patch was captured to be deformed. In a live capture situation, if an exaggerated expression is detected, the user could be given feedback to make a more neutral or less exaggerated expression. Another situation in which higher resolution analysis is greatly enhanced by using precise landmark finding is the case in which the face is in a non-frontal position. Upon detection of a non-frontal face the facial image can be warped to frontal by methods described and referenced in the report of the face recognition vendor test 2002 (FRVT 2002).

After the skin areas to be used for matching have been identified, one way to compare skin patches is to represent the identified areas as a labeled subgraph where the nodes correspond to local skin patches. The density of the nodes is chosen to achieve the optimum balance of accuracy and processing speed. At the positions of these nodes, a suitable feature vector describing the skin patch is extracted (e.g. Gabor jet, pixel patch). During the matching step for each thus selected skin patch, the feature vector is matched individually to the face region of reference image and the most similar skin patch is identified. The result is a more or less distorted version of the graph in the original image. From the similarity and distortion between the original graph and the matched graph, a similarity score is computed incorporating local geometric constraints. See, U.S. Pat. No. 6,301,370.

As far as iris analysis is concerned, accurate feature finding may pinpoint the location of the pupils and hence the surrounding iris. Also, the state of the eye (e.g., open or closed) may be detected. Naturally for iris analysis, the eye needs to be open to reveal the iris. All the skin analysis techniques described above apply to analyzing the iris.

Existing iris scanning and recognition techniques may be used for the iris analysis (step 24). Improvement to the existing techniques may lie in a tight integration of facial feature detection and tracking with face, skin and iris recognition will allow for an ultra resource efficient and fast implementation of the complete recognition engine as required for mobile devices. It is important to note that analyzing the iris pattern is in many ways less complex than analyzing a face which is subject to considerably more variation.

Figure 4:
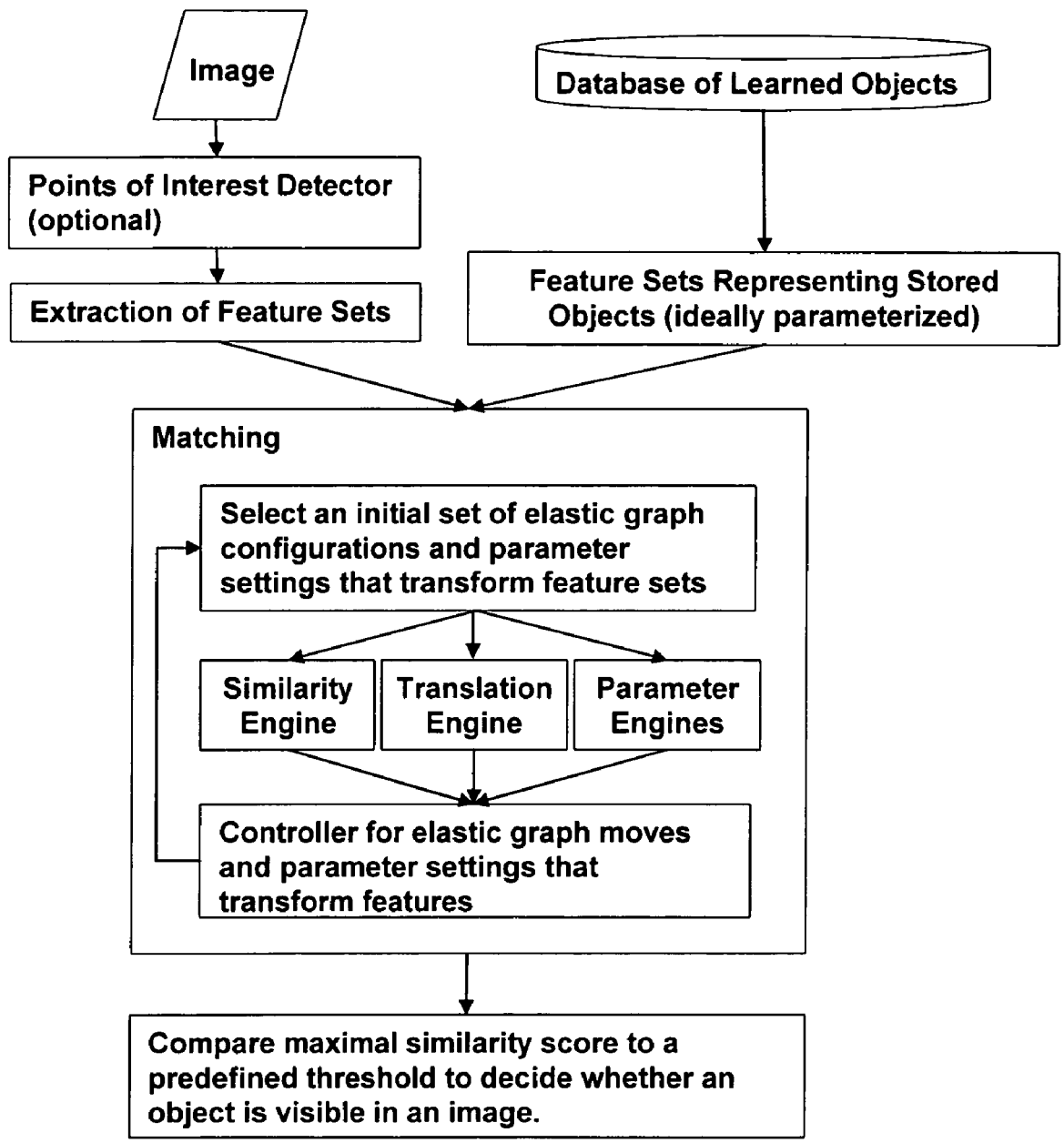
FIG. 4 is a block diagram of a visual recognition engine that may be tuned to perform face, skin and iris recognition.

With reference to FIG. 4, a visual recognition engine may be tuned to perform face, skin, and iris recognition. The macro algorithmic principles of visual recognition are: extract feature vectors from key interest points, compare corresponding feature vectors, derive a similarity measure and compare against a threshold to determine if the objects are identical or not. In the case of class recognition, such as face detection, a neural network, boosting or a support vector machine is employed to generalize from specific instances. Taking a closer look, however, one would notice that dedicated sub modules are employed to perform certain steps better than existing techniques described in the literature. More particularly:

1) Interest Operator: Using phase congruency and phase symmetry of Gabor wavelets is superior to many other interest point operators suggested in the literature such Affine Harris, DOG, and Affine Laplace.

2) Feature Vectors: The present invention makes extensive use of Gabor wavelets as a powerful general purpose data format to describe local image structure. Where appropriate, the Gabor wavelets are augmented with learned features reminiscent of the approach pioneered by Viola and Jones. Finally, the use of a dictionary of parameterized sets of feature vectors extracted from massive of image data sets that show variations of generic surface patches: "Locons", is promising. This approach has the potential to make a significant contribution in achieving better pose and illumination invariance.

3) Matching: Almost all matching routines described in the literature only consider similarity between feature vectors. Improvement may be obtained by explicitly estimating displacement vectors as well as parameter sets that describe environmental conditions such as viewpoint and illumination conditions which may allow more rapidly learning of new objects, and recognizing them under a wider range of conditions.

When making the determination of whether the individual seen on various images is the same one or not, one needs to integrate the similarity scores from the facial landmark graph and the skin and iris subgraphs. There are multiple methods described in the literature on how to accomplish this. One reference may be made to the extension report of the Face Recognition Vendor Test 2002, NISTIR 2004, which teaches methods how to integrate different approaches of face recognition as well as to the following article that shows how to optimally integrate face and iris recognition: Yun HongWang, Tieniu Tanl, and Anil K. Jain, "Combining Face and Iris Biometrics for Identity Verification" AVBPA 2003.

Empirical experience with various fusion rules has found that in the case of integrating iris, skin and facial feature analysis, the best results may be achieved with a sensor fusion method that first equalizes the match scores for each recognition channel individually to an [0,1] interval before fusing them by forming the average.

Given an image with a resolution of 4 to 5 Mega pixels, and particularly a resolution of 6 Mega pixel and above, a combination of face, skin patch and iris analysis can operate in stages on the same source image in order to drastically improve the accuracy and reliability of a face recognition system. An attractive feature enabled by the initial facial feature finding step is that modules for refined skin and iris analysis that require higher resolution can be automatically switched on or off depending on the initial determination how many pixel resolution is available between the eyes.

Another advantage of the fusion biometrics in SIMBA is that it deals very elegantly with the so-called "live check" problem. Performing a live check addresses the problem of how to determine whether the current biometric is originating from a living individual or rather from an artifact such a picture. Facial feature tracking can be used to analyze internal facial movements and thus can prevent an impostor from using still images. In a similar fashion, iris analysis can measure the changing contraction or dilation the pupil (eventually even prompted by shining a light at the pupil) to determine that a living individual is being looked at. Finally, accurate landmark finding can be used to determine whether the facial features detected all lie in a plane or not. This further allows discarding of video images that an impostor might show to the biometric system.

The SIMBA approach avoids the problem of assuming that it is permissible to ask the user to sequentially expose him to different biometrics sensors many of which are either invasive or hard to use. An effective multi-biometric system needs to be convenient to use. Existing uses of iris and fingerprint recognition show that ease of use has not been a high priority in the design. In contrast, the SIMBA approach relies only on a single 2D image sensor and employs multi-biometrics only internally in that the semi-orthogonal recognition channels exploit the biometric information contained in various aspects of the image. It is important to note the use of a robust technique for real-time facial feature tracking.

What is claimed is:

1. A face recognition method, the method performed by a computer and comprising:

selecting a single image of a face;

locating facial features in the single image;

determining whether a plurality of the located facial features lie within a plane;

responsive at least in part to determining whether the plurality of the located facial features lie within a plane, determining whether the single image represents a recorded image of an individual;

responsive at least in part to determining that the single image does not represent a recorded image of an individual:

comparing facial features located in the single image with facial features of a reference image;

comparing iris features in the single image with iris features in the reference image;

comparing skin characteristics in the single image with skin characteristics in the reference image, the comparison of skin characteristics comprising:

locating skin areas in the face suitable for skin texture analysis;

responsive to locating the facial features, detecting deformation of the located skin areas;

responsive to detecting the deformation, warping, aligning, and normalizing the located skin areas to account for the deformation, resulting in modified skin areas; and extracting skin characteristics from the modified skin areas;

calculating a similarity score between the single image and the reference image based on the facial feature comparison, the iris feature comparison, and the skin characteristics comparison; and recognizing the face based at least in part on the calculated similarity score.

2. The face recognition method of claim 1, wherein the single image has an eye distance resolution of at least 600 pixels.

3. The face recognition method of claim 1, wherein the single image comprises at least 5 mega pixels.

4. The face recognition method of claim 1, wherein the skin characteristics consist of at least one of pores, wrinkles, and moles.

5. The face recognition method of claim 1, wherein the facial features are located using elastic bunch graph matching.

6. The face recognition method of claim 1, wherein the facial features are located using Gabor wavelets.

7. A face recognition apparatus, comprising:
means for selecting a first image of a face;
means for locating a first set of facial features in the first image;
means for selecting a second image of the face;
means for locating a second set of facial features in the second image, the second set of facial features corresponding to the facial features of the first set of facial features;
means for measuring a degree of change between the diameter of a pupil of an eye of the first image and the diameter of a pupil of an eye of the second image;
means for determining that the first image represents a real-time image of a living individual, responsive at least in part to the measured degree of change;
means for comparing the first set of facial features with facial features of a reference image, responsive at least in part to determining that the single image represents a real-time image of a living individual;
means for comparing iris features in the first image with iris features in the reference image, responsive at least in part to determining that the single image represents a real-time image of a living individual;
means for comparing skin characteristics of the first image with skin characteristics of the reference image, the comparison of skin characteristics comprising:
locating skin areas in the first image suitable for skin texture analysis;
responsive to locating the first set of facial features, detecting deformation of the located skin areas;
responsive to detecting the deformation, warping, aligning, and normalizing the located skin areas to account for the deformation, resulting in modified skin areas; and
extracting skin characteristics from the modified skin areas;
means for calculating a similarity score between the single image and the reference image based on the facial feature comparison, the iris feature comparison, and the skin characteristics comparison, responsive at least in part to determining that the single image represents a real-time image of a living individual; and
means for recognizing the face based at least in part on the calculated similarity score.

8. The face recognition apparatus of claim 7, wherein the first image has an eye distance resolution of at least 600 pixels.

9. The face recognition apparatus of claim 7, wherein the first image comprises at least 5 mega pixels.

10. The face recognition apparatus of claim 7, wherein the skin characteristics consist of at least one of pores, wrinkles, and moles.

11. The face recognition apparatus of claim 7, wherein the means for determining that the single image represents a real-time image of a living individual is further responsive at least in part to analyzing internal facial movements between the first set of facial features and the second set of facial features.

12. A computer readable storage medium storing a computer program executable by a processor for performing face recognition, the actions of the computer program comprising:
selecting a single image of a face;
locating facial features in the single image;
determining whether a plurality of the located facial features lie within a plane;
responsive at least in part to determining whether the plurality of the located facial features lie within a plane, determining whether the single image represents a recorded image of an individual;
responsive at least in part to determining that the single image does not represent a recorded image of an individual:
comparing facial features located in the single image with facial features of a reference image;
comparing iris features in the single image with iris features in the reference image;
comparing skin characteristics in the single image with skin characteristics in the reference image, the comparison of skin characteristics comprising:
locating skin areas in the face suitable for skin texture analysis;
responsive to locating the facial features, detecting deformation of the located skin areas;
responsive to detecting the deformation, warping, aligning, and normalizing the located skin areas to account for the deformation, resulting in modified skin areas; and
extracting skin characteristics from the modified skin areas;
calculating a similarity score between the single image and the reference image based on the facial feature comparison, the iris feature comparison, and the skin characteristics comparison; and
recognizing the face based at least in part on the calculated similarity score.

13. The computer readable storage medium of claim 12, wherein the single image has an eye distance resolution of at least 600 pixels.

14. The computer readable storage medium of claim 12, wherein the single image comprises at least 5 mega pixels.

15. The computer readable storage medium of claim 12, wherein the skin characteristics consist of at least one of pores, wrinkles, and moles.

16. The computer readable storage medium of claim 12, wherein the facial features are located using elastic bunch graph matching.

17. The computer readable storage medium of claim 12, wherein the facial features are located using Gabor wavelets.

* * * * *